No. 743,981. Patented November 10, 1903.

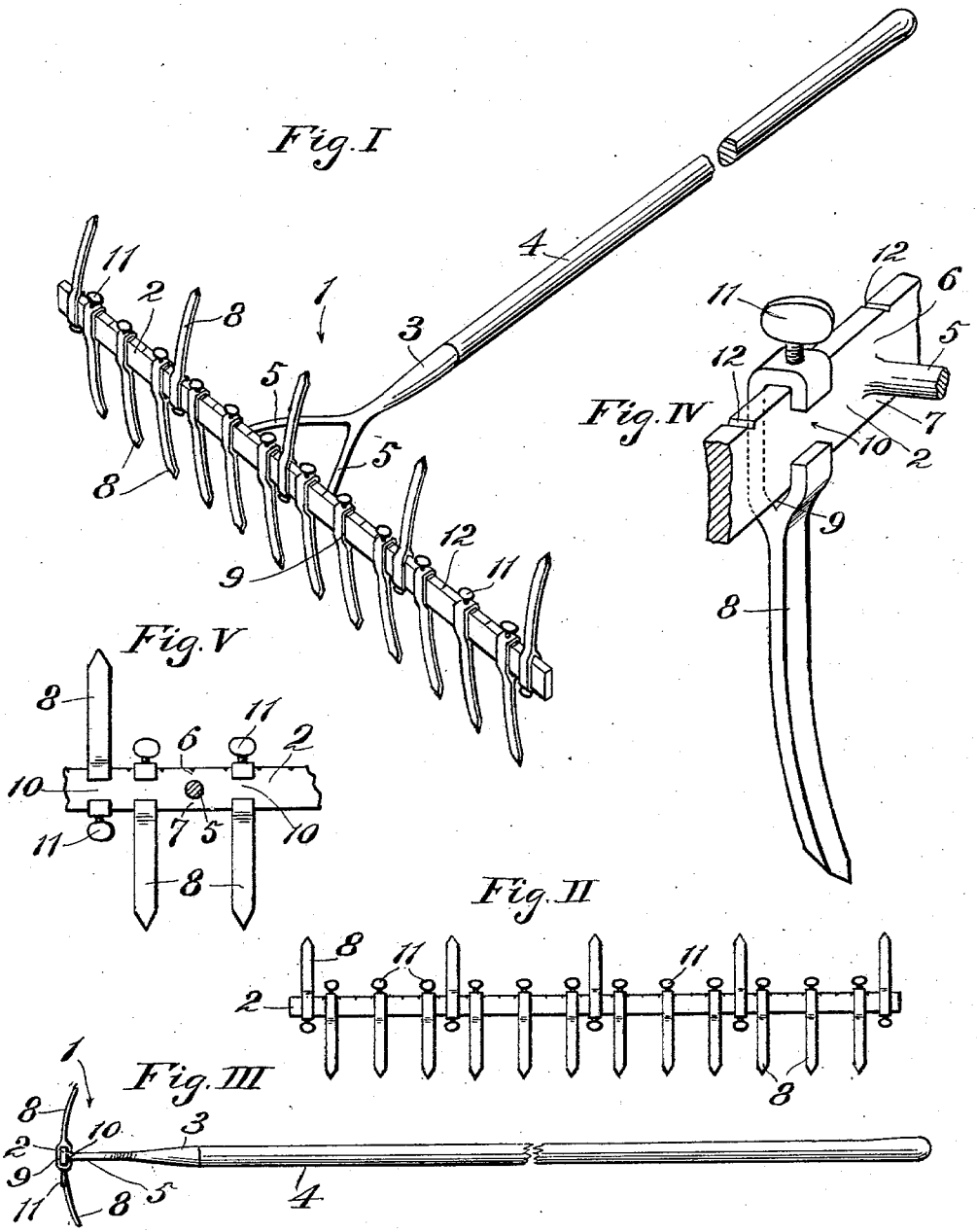

UNITED STATES PATENT OFFICE.

JULIUS E. HAGEN, OF SANTA MONICA, CALIFORNIA.

ADJUSTABLE LAND-MARKER.

SPECIFICATION forming part of Letters Patent No. 743,981, dated November 10, 1903.

Application filed May 21, 1903. Serial No. 158,081. (No model.)

*To all whom it may concern:*

Be it known that I, JULIUS E. HAGEN, a citizen of the United States, residing at Santa Monica, in the county of Los Angeles and State of California, have invented a new and useful Adjustable Land-Marker, of which the following is a specification.

This invention relates to a toothed hand-operated garden and field tool for use in drilling in seeds.

An object is to provide a simple handy garden implement which may be easily adjusted to mark out drills at various distances apart and may be used to form several drills at a time.

Another object is to provide a hand-operated garden and field tool of the class described furnished with adjustable teeth, all of one pattern, so mounted to adapt the tool for making drills at two different distances apart without any change of adjustment.

The accompanying drawings illustrate the invention, and, referring to said drawings, Figure I is a perspective view of my improved marker provided with teeth in position for use. Fig. II is an end view of Fig. I, being taken from the side of the head opposite to the handle. Fig. III is a side view of the implement. Fig. IV is a perspective detail view of one of the adjustable marking-teeth, showing a fragment of the cross-bar with a tooth attached thereto. Fig. V is a fragmental view looking from the side of the device to which the handle is attached.

Referring in detail to the drawings, 1 designates the head, which may be cast in a single piece and is provided with a cross-bar 2 and a hollow shank 3, adapted to receive a handle 4. Cross-bar 2 is desirably rectangular in cross-section and comparatively thin in proportion to its breadth and length.

5 designates arms by which the shank and cross-bar are united. Said arms each join to the cross-bar at the mid-width thereof, leaving equal spaces at 6 and 7 in the inner side of the cross-bar between arms 5 and the side edges of the cross-bar.

8 designates teeth, which may all be of the same pattern and adjustable longitudinally of the cross-bar. The head of each of said teeth has an elongated eye 9, adapted to closely but slidably fit cross-bar 2, there being a cut-away portion or open-ended slot 10, leading from the mid-length of the eye to the side of the head. The tooth is designed to be mounted on the cross-bar with the cut 10 on the same side as arms 5, so that the tooth may be slid along the cross-bar from end to end thereof, past the place where arms 5 are united to said bar, the cut being a little wider than the diameter of arms 5. Since said arms are united to the mid-width of bar 2 and the cut-away portion 10 is at the mid-length of the eye 9, the same tooth will slide past the arms whichever way the point is turned, as best illustrated in Fig. V. Thumb-screws 11 may be provided to detachably hold the teeth in place.

12 designates the marks or cuts of a graduated scale whereby the operator may determine the distances apart at which to set the teeth. Said cuts 12 may be made deep enough to act as sockets for the ends of the thumb-screws, thereby to assist in holding the teeth in place. The teeth may be arranged in two sets which project oppositely, so that the operator may make drills at two different distances apart without change of adjustment by simply reversing the tool.

It is to be understood that this invention is not limited to the exact construction illustrated and described, but that many alterations may be made in the details thereof without departing from the spirit of the invention.

What I claim, and desire to secure by Letters Patent of the United States, is—

1. In a marker, a head provided with a handle and a cross-bar, and longitudinally-adjustable teeth mounted on said bar and adapted to slide from end to end thereof.

2. A marker provided with an eyeleted tooth having an open-ended slot leading to said eye.

3. A marker provided with a tooth having an elongated eye, there being an open-ended slot leading to the mid-length of said eye.

4. In a marker, in combination, a head provided with a cross-bar and a handle attached thereto by an arm, and a tooth provided with an eye adapted to fit said cross-bar, there being a cut leading to said eye.

5. In a marker, in combination, a head provided with a cross-bar and a handle attached to the mid-width of said cross-bar by an arm, and a tooth provided with an elongated eye adapted to fit said cross-bar, there being a cut leading to the mid-length of said eye.

6. In a marker, in combination, a head provided with a cross-bar substantially rectangular in cross-section and a handle attached to said cross-bar by an arm, there being a space between the arm and a side edge of the cross-bar, and a tooth provided with an eye adapted to fit said cross-bar, there being a cut leading to said eye.

7. In a marker, in combination, a head provided with a cross-bar substantially rectangular in cross-section and a handle attached to said cross-bar by an arm, there being equal spaces between said arm and the side edges of the cross-bar, and a tooth provided with an elongated eye adapted to fit said cross-bar, there being a cut leading to the mid-length of said eye.

8. In a marker, a head provided with a handle and a cross-bar, said cross-bar provided with graduated cuts, an adjustable tooth mounted on said bar, and a thumb-screw carried by said tooth and adapted to be screwed into said cuts.

In testimony whereof I have signed my name to this specification, in the presence of two subscribing witnesses, at Santa Monica, in the county of Los Angeles and State of California, this 14th day of May, 1903.

JULIUS E. HAGEN.

Witnesses:
R. M. MILLER,
G. WILEY WELLS.